(12) United States Patent
Omori (10) Patent No.: US 12,503,157 B2
(45) Date of Patent: Dec. 23, 2025

(54) VEHICLE CONTROL DEVICE, VEHICLE CONTROL METHOD, AND STORAGE MEDIUM

(71) Applicant: TOYOTA JIDOSHA KABUSHIKI KAISHA, Toyota (JP)

(72) Inventor: Kosei Omori, Tsu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 76 days.

(21) Appl. No.: 18/638,908

(22) Filed: Apr. 18, 2024

(65) Prior Publication Data

US 2025/0050942 A1 Feb. 13, 2025

(30) Foreign Application Priority Data

Aug. 8, 2023 (JP) .................................. 2023-129342

(51) Int. Cl.
*B62D 6/00* (2006.01)
(52) U.S. Cl.
CPC .................................. *B62D 6/001* (2013.01)
(58) Field of Classification Search
CPC ...... B60W 30/12; B60W 40/09; B60W 50/00; B62D 15/025; B62D 6/001
See application file for complete search history.

(56) References Cited

U.S. PATENT DOCUMENTS

| | | | |
|---|---|---|---|
| 10,220,853 B2* | 3/2019 | Habu | B60W 10/04 |
| 11,230,320 B2* | 1/2022 | Fukaya | B62D 15/0265 |
| 11,939,015 B2* | 3/2024 | Takeuchi | B62D 1/286 |
| 11,958,484 B2* | 4/2024 | Brandin | G05D 1/248 |
| 12,304,525 B2* | 5/2025 | Kumazaki | B60W 60/001 |
| 2009/0034799 A1* | 2/2009 | Nishida | G05D 1/0244 |
| | | | 382/104 |
| 2011/0095879 A1* | 4/2011 | Heracles | B60W 50/06 |
| | | | 901/1 |
| 2016/0107687 A1* | 4/2016 | Yamaoka | B62D 15/025 |
| | | | 701/41 |
| 2018/0141588 A1* | 5/2018 | Shimizu | B62D 15/0265 |
| 2018/0170370 A1* | 6/2018 | Kataoka | B60W 30/09 |
| 2021/0124990 A1* | 4/2021 | Lian | G06V 20/10 |
| 2023/0031839 A1 | 2/2023 | Okano et al. | |
| 2023/0127678 A1 | 4/2023 | Miyawaki | |
| 2024/0262414 A1* | 8/2024 | Omori | B62D 6/00 |
| 2025/0083686 A1* | 3/2025 | Okada | B60W 30/0956 |

FOREIGN PATENT DOCUMENTS

| | | |
|---|---|---|
| JP | 2023-019012 A | 2/2023 |
| JP | 2023-062261 A | 5/2023 |

* cited by examiner

*Primary Examiner* — Carl C Staubach
(74) *Attorney, Agent, or Firm* — SoraIP, Inc.

(57) ABSTRACT

When the driver performs a steering operation when the scene in which the host vehicle is traveling is a predetermined learning scene, the vehicle control device stores a value corresponding to the steering operation in association with the learning scene. Thereafter, when the scene specified by the peripheral information changes to the learning scene during the execution of the driving support control, and/or when the scene specified by the peripheral information at the time when the execution of the driving support control is started is the learning scene, the vehicle control device changes the target lateral position based on the stored learning value.

5 Claims, 6 Drawing Sheets

VEHICLE CONTROL DEVICE, VEHICLE CONTROL METHOD, AND STORAGE MEDIUM

CROSS-REFERENCE TO RELATED APPLICATION

This application claims priority to Japanese Patent Application No. 2023-129342 filed on Aug. 8, 2023, incorporated herein by reference in its entirety.

BACKGROUND

1. Technical Field

The present disclosure relates to a vehicle control device, a vehicle control method, and a storage medium that automatically steer a host vehicle such that the lateral position of the host vehicle coincides with a target lateral position.

2. Description of Related Art

A conventional vehicle control device (hereinafter referred to as a "conventional device") executes lane keeping control in which a center line of a lane (traveling lane) of a host vehicle is set as a target traveling line and the host vehicle is automatically steered such that a reference point of the host vehicle moves along the target traveling line. Further, the conventional device changes the position of the target traveling line such that the target traveling line becomes a line between the center line and the reference point of the host vehicle when a steering operation force of a driver becomes equal to or greater than a threshold value during execution of the lane keeping control (see Japanese Unexamined Patent Application Publication No. 2023-62261 (JP 2023-62261 A)).

SUMMARY

In a specific scene in which the host vehicle is traveling in a lane in a provisional shared section, for example, the driver may desire to constantly drive the host vehicle along a "line slightly shifted in a direction of approaching a road shoulder, rather than the center line of the lane". With the conventional device, however, the driver needs to apply a large steering operation force to a steering wheel every time the specific scene starts, and thus feels such a steering operation troublesome. The present disclosure has been made to address such an issue.

An aspect of the present disclosure provides a vehicle control device including:
- an information acquisition device (10, 20, 30) that acquires peripheral information indicating a peripheral state of a host vehicle including a marking line of a traveling lane as a lane in which the host vehicle is traveling; and
- a controller (10) that executes driving assist control (e.g. lane keeping control) for automatically steering the host vehicle based on the peripheral information such that a lateral position of the host vehicle with respect to the traveling lane coincides with a target lateral position set in the traveling lane, in which:
  the controller is configured to store, when a steering deviation state in which the lateral position of the host vehicle deviates from the target lateral position is caused by a steering operation by a driver of the host vehicle during execution of the driving assist control (S240, S525), a value corresponding to the steering operation by the driver as a learning value in association with a learning scene (first scene, second scene) determined in advance (S245, S555) when a scene specified by the peripheral information is the learning scene; and the controller is configured to vary the target lateral position based on the stored learning value (S255, S480) in at least one of a case where the scene specified by the peripheral information varies from a scene other than the learning scene to the learning scene during the execution of the driving assist control (S220, S440) and a case where a scene specified by the peripheral information at a time point when the execution of the driving assist control is started is the learning scene (S220), after storing the learning value (S225, S450).

According to the above aspect, when the scene specified by the peripheral information is a learning scene determined in advance and a steering deviation state in which the lateral position of the host vehicle deviates from the target lateral position is caused by a steering operation by the driver, a value corresponding to the steering operation is stored in association with the learning scene. Then, after that, the target lateral position is varied based on the stored learning value when the scene specified by the peripheral information during execution of the driving assist control varies from a scene other than the learning scene to the learning scene, and/or when the scene specified by the peripheral information at the time when the execution of the driving assist control is started is the learning scene. As a result, the target lateral position becomes a value corresponding to the preference of the driver, and thus the possibility that the driver must perform a steering operation every time a similar scene occurs is reduced. Therefore, it is possible to reduce the frequency of steering operations that the driver feels troublesome.

The vehicle control device may perform supervised training in order to highly accurately determine whether the scene specified by the peripheral information is a learning scene determined in advance using image data. Further, the present disclosure provides a vehicle control method and a program thereof. Each constituent element of the present disclosure is not limited to the embodiment defined by the reference numeral in the above summary of the disclosure.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
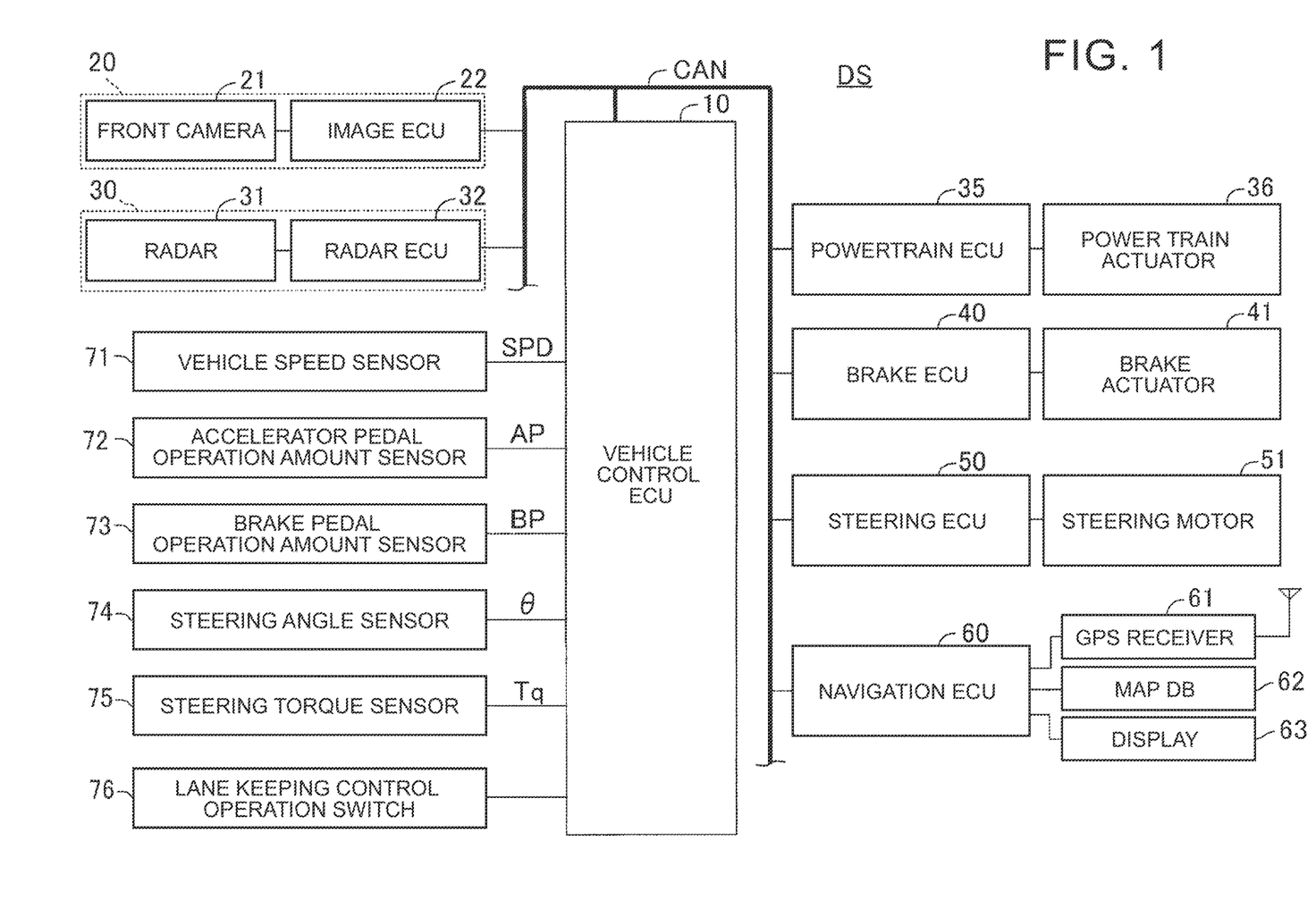
FIG. 1 is a schematic configuration diagram of a vehicle control device according to a first embodiment of the present disclosure.

The vehicle control device DS (hereinafter, referred to as "device DS") according to the first embodiment of the present disclosure includes components described later with reference to FIG. 1, and is applied to (mounted on) the host vehicle. The vehicle control device according to the second embodiment described later has the same configuration as that of the device DS.

In the present specification, "ECU" is an Electronic Control Unit including a microcomputer including a CPU (processor), a memory, and the like as a main part, and is also referred to as a controller. The memory is an example of a storage medium. The components shown in FIG. 1 including a plurality of ECUs are connected to each other in an information-exchangeable manner through a Controller Area Network (CAN).

The vehicle control ECU 10 executes lane keeping control, which is one of driving assistance controls described later.

The front camera device 20 includes a front camera 21 and an image ECU 22. Each time a predetermined time elapses, the front camera 21 captures an image of "a scene in front of the host vehicle (including a dividing line such as a white line and a yellow line, and a target such as a pole and another vehicle)" and acquires image data. The image ECU 22 analyzes the image data from the front camera 21 to generate camera target information including the "position, relative longitudinal speed, relative lateral speed, type" and the like of the target in the image data. The types of targets include a pole, a roadside structure, another vehicle, and the like. Further, the image ECU 22 acquires lateral position information including a lateral position (a distance between a center line of the left and right dividing lines and a reference point of the own vehicle in the lane width direction) of the own vehicle in the own lane (hereinafter, also referred to as "traveling lane") on which the own vehicle is traveling, an angle (yaw angle) formed between the traveling direction of the own vehicle and the center line, and the like. Further, the image ECU 22 may be configured to identify the type of the division line (such as a white line and a yellow line) based on the image data, and obtain the division line identification result. The image ECU 22 transmits the acquired information to the vehicle control ECU 10.

The radar device 30 is a well-known device that acquires information about a target object existing in front of the host vehicle by using a millimeter-wave band radio wave, and includes a radar 31 and a radar ECU 32. The radar 31 transmits the transmitted radio waves and the received reflected waves to the radar ECU 32. The radar ECU 32 acquires radar target information based on the information from the radar 31, and transmits the radar target information to the vehicle control ECU 10. The radar target information includes a distance to the target, an orientation of the target, a relative velocity of the target, and the like.

The powertrain ECU 35 is drivingly connected to the powertrain actuator 36. The actuator 36 is capable of changing the torque generated by the driving device (driving force source) of the host vehicle. The torque generated by the driving device is transmitted to the driving wheels via a gear mechanism. Therefore, the powertrain ECU 35 can control the driving force of the own vehicle.

When the driving device of the own vehicle is an internal combustion engine of gasoline fuel, the actuator 36 is, for example, a throttle valve actuator that changes the opening degree of the throttle valve. The host vehicle may be a battery electric vehicle, where the actuator 36 is an inverter capable of changing the torque of the electric motor. The host vehicle may be a hybrid electric vehicle, where the actuator 36 includes an inverter for an electric motor and a throttle valve actuator for an internal combustion engine.

The brake ECU 40 controls the friction braking devices disposed on the respective wheels of the host vehicle by driving the brake actuator 41 to change the friction braking force applied to the host vehicle. That is, the brake ECU 40 can control the braking force applied to the host vehicle.

The steering ECU 50 can control the steering angle of the host vehicle by driving the steering motor 51.

The navigation ECU 60 is connected to a GPS (or GNSS) receiver 61, a map database 62 and a display touch panel 63 displaying touch buttons. The navigation ECU 60 acquires the present position of the host vehicle based on GPS received by GPS receiver 61. The navigation ECU 60 acquires, from the map database 62, information about the road on which the host vehicle is currently traveling. The information on the road includes, for example, information on whether or not the traveling lane on which the host vehicle is currently traveling is a vehicle dedicated road and whether or not the traveling lane is in a provisional shared section. The provisional shared section is a road of two lanes (all four lanes) on one side, but is provisionally a road of one lane (all two lanes).

The vehicle control ECU 10 is further connected to a "sensor for detecting a parameter indicating a driving condition of the own vehicle" and a switch described below, and is configured to receive a value (signal) detected or output by the sensor.

The vehicle speed sensor 71 detects the speed of the host vehicle (that is, the vehicle speed SPD).

An accelerator pedal operation amount sensor 72 that detects an operation amount AP of an accelerator pedal of the host vehicle.

The brake pedal operation amount sensor 73 detects the operation amount BP of the brake pedal of the host vehicle.

A steering angle sensor 74 for detecting a steering angle θ of the host vehicle.

A steering torque sensor 75 for detecting a steering torque Tq inputted to a steering wheel of the host vehicle.

A lane keeping control operation switch 76 which is operated by the driver of the own vehicle and outputs either an ON signal (lane keeping control request signal) or an OFF signal (lane keeping control end request signal).

Operation of the First Embodiment

Figure 2:
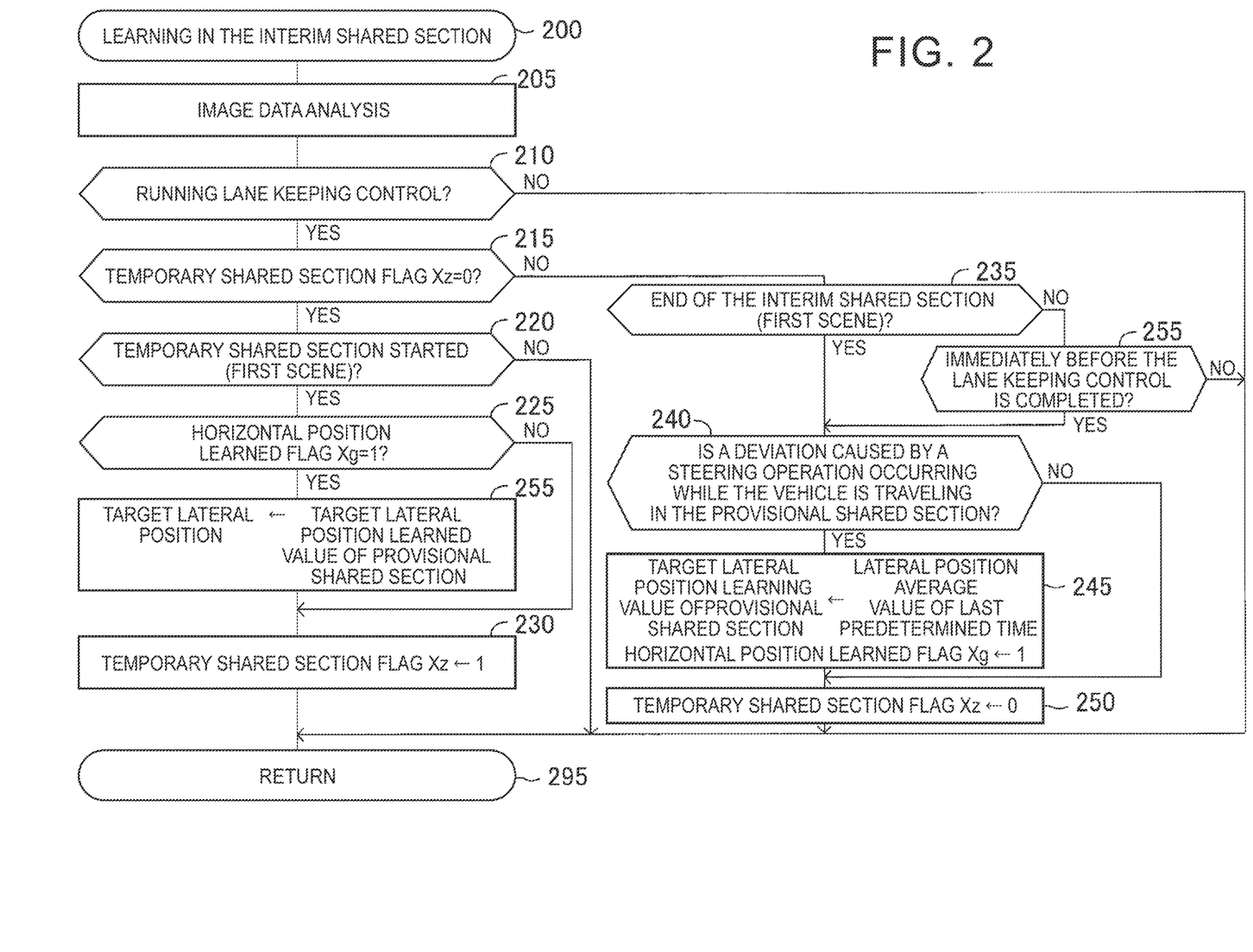
FIG. 2 is a flow chart executed by the vehicle control ECU of FIG. 1.

CPU of the vehicle control ECU 10 (hereinafter, simply referred to as "CPU") is executed every time a predetermined period elapses in the routine illustrated by the flow chart in FIG. 2.

When an appropriate time point has arrived, CPU starts the process from step 200 of FIG. 2 (hereinafter, step is referred to as "S"), proceeds to S205, and analyzes the image-data to identify what scene the scene in front of the host vehicle is.

CPU then proceeds to S210 to determine if CPU is currently performing lane keeping control. CPU determines whether or not the lane keeping control execution condition is satisfied by executing a routine (not shown), and executes a known lane keeping control for controlling the steering angle based on the lateral position information so that a reference point (for example, a center position between the left front wheel and the right front wheel) of the host vehicle coincides with a predetermined target lateral position during a time period in which the lane keeping control execution condition is satisfied.

For example, the lane keeping control execution condition is satisfied when any of the conditions 1 and 2 described below is satisfied, and is not satisfied when at least one of the conditions 1 and 2 is not satisfied.
(Condition 1) The road on which the host vehicle is traveling is a vehicle dedicated road. Whether or not the condition 1 is satisfied is determined based on S205 image-data-analysis and/or the roadway-information obtained from the navigation ECU 60.
(Condition 2) The signal from the lane keeping control operation switch 76 operated by the driver is an ON signal. That is, the driver requests execution of the lane keeping control.

When CPU is currently executing the lane keeping control, CPU proceeds from S210 to S215 to determine whether or not the provisional shared section flag Xz is "0".

When the value of the provisional shared section flag Xz is "O" (that is, when the traveling lane is recognized to be outside the provisional shared section until the present time), CPU proceeds from S215 to S220, and determines whether the present time is immediately after the provisional shared section is started based on the analysis result of the image data in S205. In other words, CPU determines whether or not the traveling lane has entered the provisional shared section from outside the provisional shared section by S220. That is, CPU determines whether or not the scene specified by the surrounding information including the image data has changed to "the first scene indicating that the traveling lane is within the provisional shared section". When CPU recognizes that the centerline of the traveling lane is the "yellow line, white line, and pole" in the order from the traveling lane toward the opposite lane, it determines that the traveling lane is within the provisional shared section. CPU may determine S220 by acquiring, from the map database 62, whether or not the traveling lane is within the provisional shared section.

When the present time point is immediately after the provisional shared section is started, CPU proceeds from S220 to S225, and by determining whether or not the value of the lateral position learned flag Xg to be described later is "1", it is determined whether or not the host vehicle has traveled the provisional shared section to date and the lateral position of the host vehicle at that time is stored (learned) as the learned value (first learned value).

When the value of the lateral position learned flag Xg is not "1", CPU proceeds directly from S225 to S230 and sets the value of the provisional shared section flag Xz to "1". After that, CPU proceeds to S295 and ends the routine once. In this case, the target lateral position is set to the reference lateral position (which is a default value, for example, the center position of the left division line and the right division line). This causes CPU to proceed from S215 to S235 when CPU next proceeds to S215.

CPU determines at S235 whether or not the current time point is immediately after the provisional shared section is completed. In other words, CPU determines, at S235, whether the traveling lane has entered the provisional shared section from within the provisional shared section to outside the provisional shared section. That is, CPU determines whether or not the scene specified by the surrounding data including the image data becomes a scene other than the first scene from the first scene. If the current time is immediately after the provisional shared section has ended, CPU proceeds from S235 to S240.

CPU determines whether or not a steering deviation state, which is a state in which the lateral position of the own vehicle deviates from the "target lateral position set at the starting point of the provisional sharing section" by the driver's steering operation by a predetermined distance or more, has occurred while the provisional sharing section is traveling in S240. When the steering deviation condition has occurred, CPU proceeds to S245, and the mean value of the lateral position of the host vehicle at the latest predetermined time is stored in a non-volatile memory (not shown) as the target lateral position learning value (first learning value) of the provisional shared section, and the value of the lateral position learned flag Xg is set to "1". Next, CPU proceeds to S250, sets the provisional shared section flag Xz to "0", and then proceeds to S295. On the other hand, if no steering deviation occurs, CPU proceeds directly from S240 to S250.

Further, if the current time point is not immediately after the tentative shared section ends, CPU proceeds from S235 to S255, and determines whether the current time point is "immediately before the lane keeping control is ended due to the lane keeping control execution condition being not satisfied". If the current time point is just before the lane keeping control is terminated, CPU proceeds from S255 to S240. On the other hand, if the lane keeping control continues at the present time, CPU proceeds from S255 to S295.

When the processes of S245 and S250 are executed, the value of the lateral position learned flag Xg is set to "1", and therefore, when CPU proceeds to S225, the process proceeds from S225 to S255, and the target lateral position is set to the target lateral position learned value (first learned value) of the provisional shared section.

If the lane keeping control is not executed at the point of time when CPU proceeds to S210, S295 directly proceeds from S210 to terminate the routine. Further, if the traveling lane is within the provisional shared section at the time when the execution of the lane keeping control is started, CPU determines "Yes" in the respective steps of S210 to S220 and proceeds to S225.

Figure 3A:
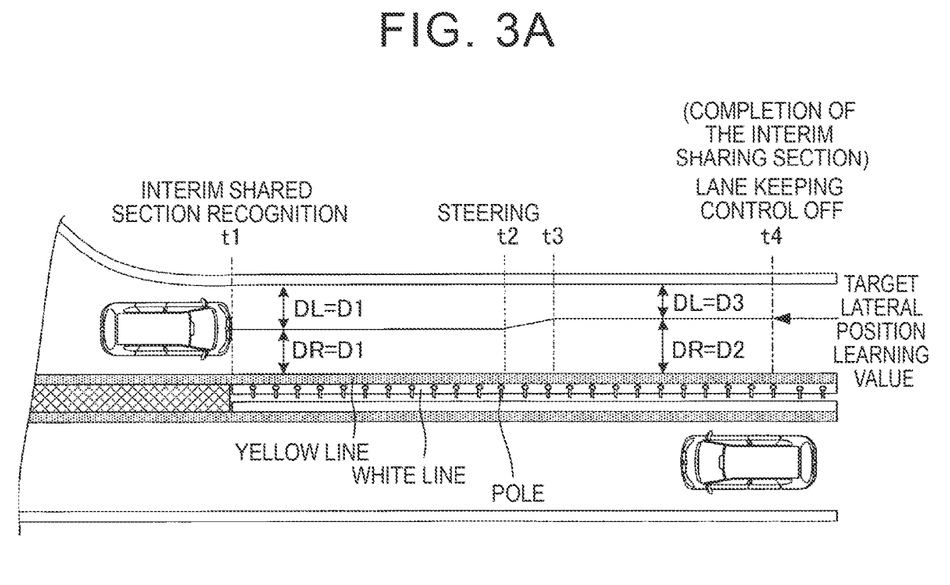
FIG. 3A is a block diagram illustrating an operation of a vehicle control device according to a first embodiment of the present disclosure.

Since the device DS operates as described above, for example, when the own vehicle that is executing the lane keeping control at the time t1 in FIG. 3A enters the provisional shared section and the learning of the first learning-value has not been completed, the target lateral position is set to the reference lateral position (the position of the center line of the left and right dividing lines). The reference lateral position is a position where the distance DL from the left division line is D1 and the distance DR from the right division line is D1. Thereafter, the driver performs steering from the time t2 to the time t3, and the position at which the subject vehicle is traveling after the time t3 is shifted to the left side from the center line. Then, when the lane keeping control ends or the provisional shared section ends at the time t4, the device DS stores "a lateral position where the distance DL is D3 and the distance DR is D2" as the first learned value.

Figure 3B:
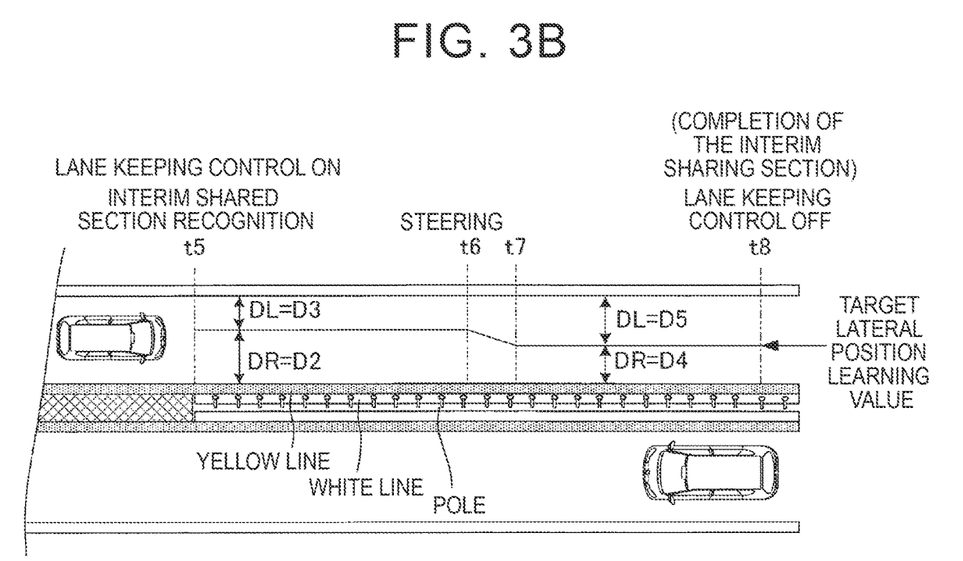
FIG. 3B is a block diagram illustrating an operation of a vehicle control device according to a first embodiment of the present disclosure.

Thereafter, for example, when the lane keeping control is started at the time t5 in FIG. 3B and the device DS recognizes that the traveling lane at that time is in the provisional shared section, the target lateral position is set to the first learned value (the lateral position where the distance DL is D3 and the distance DR is D2). Thereafter, the driver performs steering from the time t6 to the time t7, and the position at which the subject vehicle is traveling after the time t7 is shifted to the right side. Then, when the lane keeping control ends or the provisional shared section ends at the time t8, the device DS stores "a lateral position where the distance DL is D5 and the distance DR is D4" as the first learned value.

Operation of the Second Embodiment

Figure 4:
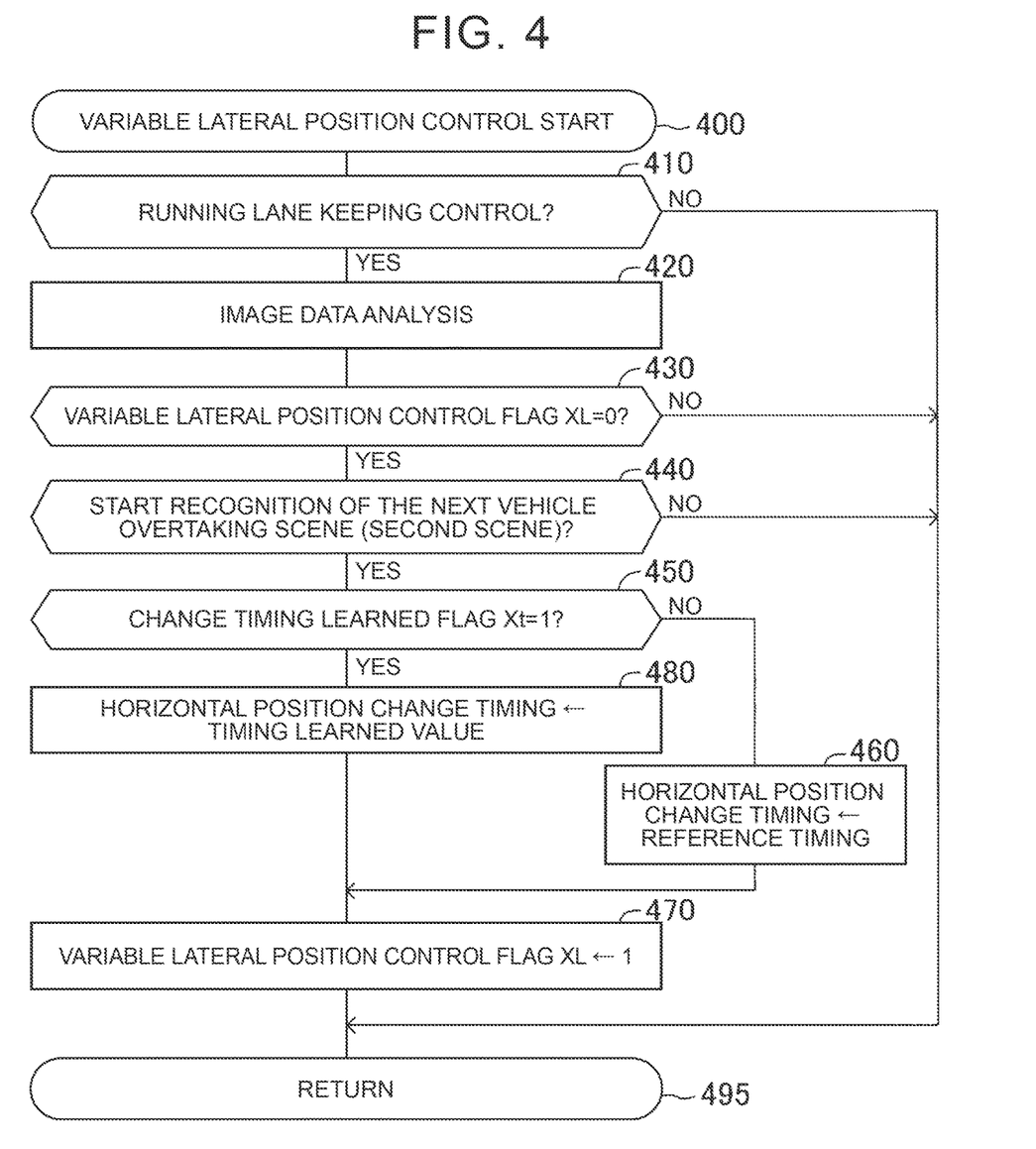
FIG. 4 is a flow chart executed by a vehicle control ECU (second ECU) of the vehicle control device according to the second embodiment of the present disclosure.
Figure 5:
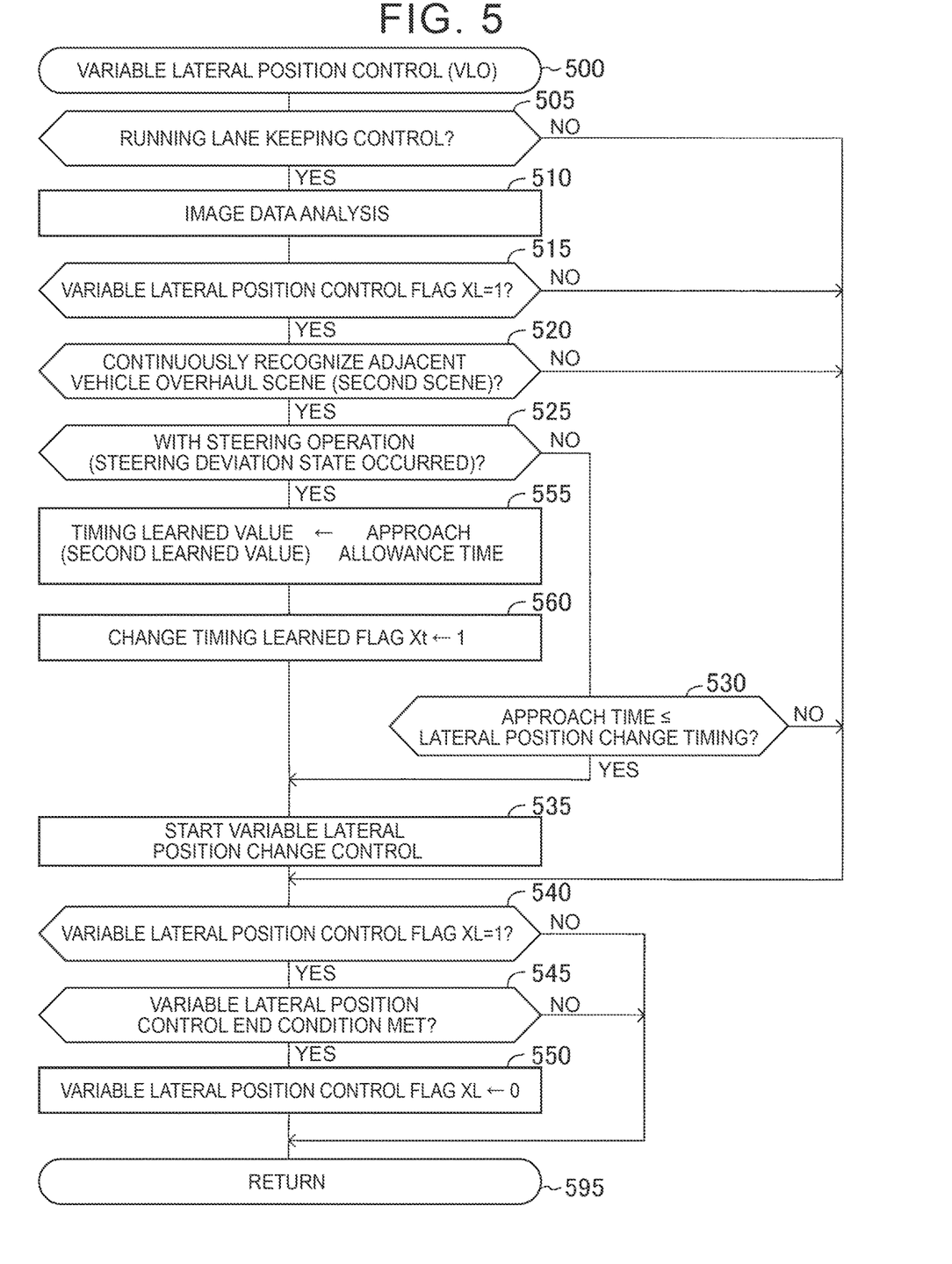
FIG. 5 is a routine (flow chart) performed by second ECU.

CPU of the vehicle control ECU 10 according to the second embodiment is executed every time a predetermined period elapses in the routines shown in the flow charts in FIGS. 4 and 5. Therefore, when an appropriate time point has arrived, CPU starts the process from S400 of FIG. 4 and determines whether or not CPU is currently executing the lane keeping control at S410.

If CPU is currently performing lane keeping control, CPU proceeds from S410 to S420 and analyzes the images to determine what scene is in front of the host vehicle. Next, CPU determines whether or not the variable lateral position control flag XL is "O" in S430. When the variable lateral position control (Variable Lateral Offset (VLO) described later is being executed, the value of the variable lateral position control flag XL is set to "1", and when the variable lateral position control is not being executed, the value of the variable lateral position control flag XL is set to "0".

Figure 6A:
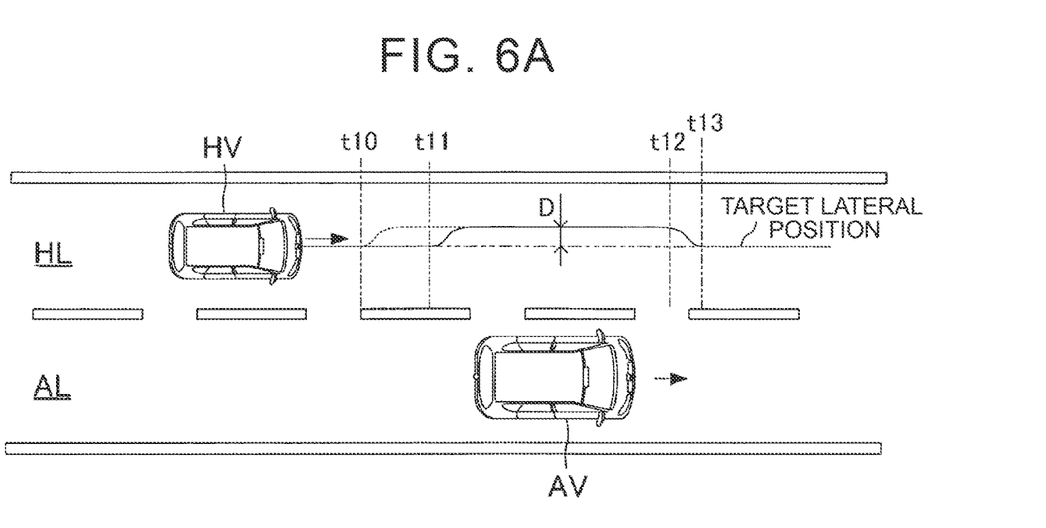
FIG. 6A is a diagram for explaining an operation of a vehicle control device according to a second embodiment of the present disclosure.

When the value of the variable lateral position control flag XL is "0", CPU proceeds from S430 to S440 and, as shown in FIG. 6A, determines whether or not the current time point is immediately after recognizing that the current time point is "the second scene in which the host vehicle HV passes through the neighboring vehicle AV" based on S420. Note that the second scene is started when "adjacent vehicle AV which is another vehicle having a vehicle speed lower than the vehicle speed of the host vehicle HV" is traveling on the adjacent lane AL adjacent to the traveling lane HL, and the margin time TTC (approach margin time TTC=(the distance between the adjacent vehicle AV and the host vehicle HV)/(the relative speed of the adjacent vehicle AV)) until the leading end of the host vehicle HV approaches the trailing end of the adjacent vehicle AV becomes equal to or less than the second scene setting threshold value.

If the current time point is not immediately after being recognized as the second scene, CPU proceeds directly from S440 to S495 and terminates the routine once. On the other hand, if the current time point is immediately after being recognized as the second scene, CPU proceeds from S440 to S450 and determines whether or not the value of the change timing learned flag Xt is "1", thereby determining whether or not the host vehicle has stored (learned) the lateral position change timing as the learned value (the second learned value) by the current time point.

If the value of the learned flag Xt is not "1", CPU proceeds from S450 to S460 and sets the lateral position change timing representing the threshold margin time to a reference timing (a default value in units of time, e.g., 2 seconds). Next, CPU sets the variable lateral position control flag XL to "1" in S470, and proceeds to S495.

On the other hand, when the value of the learned flag Xt is "1", CPU proceeds from S450 to S480, and sets the lateral position change timing indicating the threshold-margin time to a timing learned value (second learned value), which will be described later. CPU then proceeds to S470 and S495.

When CPU determines "No" in S410 (that is, when the lane keeping control is not executed), it proceeds to S495. When CPU determines "No" in S430 (that is, when the variable lateral position control is being executed), it proceeds directly to S495.

When an appropriate time point has arrived, CPU starts the process from S500 of FIG. 5 and determines whether or not CPU is currently executing lane keeping control by proceeding to S505.

If CPU is currently performing lane keeping control, CPU proceeds from S505 to S510 and analyzes the images to determine what scene is in front of the host vehicle. Next, CPU determines whether or not the variable lateral position control flag XL is "1" in S515.

When the variable lateral position control flag XL is "1", CPU proceeds from S515 to S520 to determine whether the above-described second scene is continuously recognized based on S510. If the second scene is continuously recognized, CPU proceeds from S520 to S525 to determine whether the steering torque Tq is equal to or greater than the threshold torque, thereby determining whether or not the driver has operated the steering (that is, whether or not a steering deviation condition has occurred).

If there is no steering action by the driver, CPU proceeds from S525 to S530 and determines whether the actual approach margin time TTC is less than or equal to the threshold time set as the lateral position change timing. If the approach margin time TTC is not less than or equal to the lateral position change timing, CPU proceeds from S530 to S540. On the other hand, when the approach margin time TTC is equal to or less than the lateral position change timing, CPU proceeds from S530 to S535, and starts the shift of the target lateral position by the variable lateral position change control. As a result, the target lateral position is shifted away from the adjacent lane on which the adjacent vehicle is traveling by the predetermined distance D from the time when the approach margin time TTC becomes equal to or less than the lateral position change timing until the time when the variable lateral position control terminating condition to be described later is satisfied (refer to the time t13 from the time t11 in FIG. 6A).

CPU determines whether or not the variable lateral position control flag XL is "1" in S540. When the variable lateral position control flag XL is "0", CPU proceeds directly from S540 to S595 and terminates the routine once. On the other hand, if the variable lateral position control flag XL is "1", CPU proceeds from S540 to S545 to determine whether or not the variable lateral position control is terminated. This termination condition is satisfied when the second scene has disappeared or the host vehicle has passed through an adjacent vehicle and the determination is made based on "a rear camera image acquired by a rear camera (not shown) or target information acquired by a rear side radar (not shown)".

If the termination condition of the variable lateral position control is not satisfied, CPU proceeds directly from S545 to S595. On the other hand, if the terminating condition of the variable lateral position control is satisfied, CPU proceeds from S545 to S550, sets the variable lateral position control flag XL to "0", and proceeds to S595.

On the other hand, when CPU advances to S525, if the driver's own vehicle is steered away from the neighboring lane prior to the approach margin time TTC becoming equal to or less than the lateral position change timing, CPU advances from S525 to S555 and learns (stores) the approach margin time at that time as the second learned value (timing learned value). Next, CPU proceeds to S560 and sets the change timing-learned flag Xt to "1". CPU then proceeds to S535. The time t10 in FIG. 6A in which the driver performs the steering operation changes according to the driver's steering operation as indicated by the broken line.

Figure 6B:
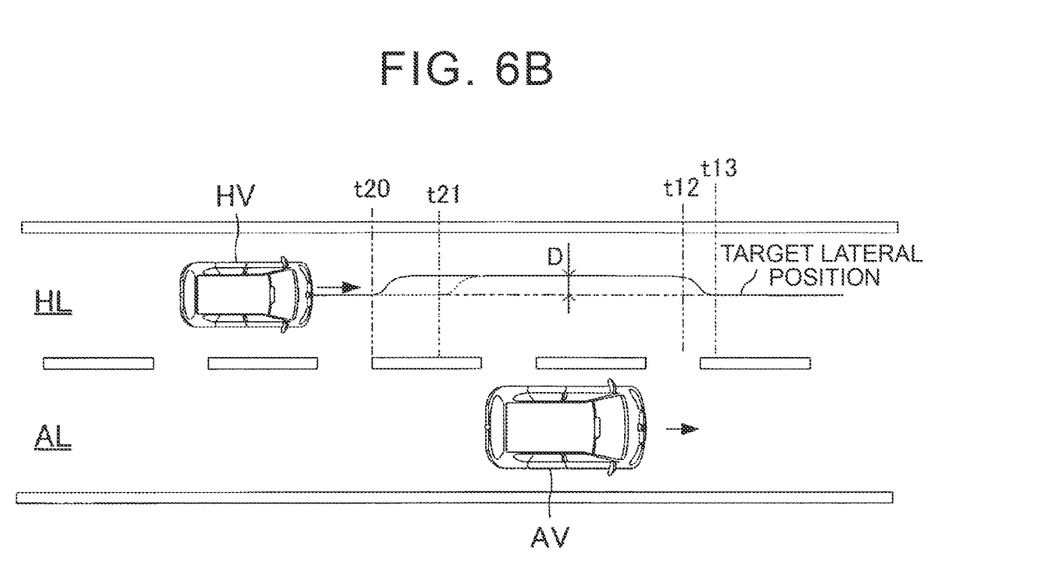
FIG. 6B is a diagram for explaining an operation of a vehicle control device according to a second embodiment of the present disclosure.

As a consequence, when CPU recognizes the next neighboring vehicle-overtaking scene (second scene), it proceeds from S450 to S480 of FIG. 4, so that the lateral position change timing is set to the timing learned value (second learned value). Therefore, the timing at which "Yes" is determined in S530 of FIG. 5 is changed to the timing according to the preference of the driver (refer to the time t20 and subsequent steps in FIG. 6B).

If CPU determines "No" in S505, S515 and S520 steps, the process proceeds directly from the respective steps to S540.

As described above, according to the device DS, when the driver performs the steering operation when the scene in which the host vehicle is traveling is a predetermined learning scene, the value corresponding to the steering operation is stored in association with the learning scene. Then, when the scene specified by the peripheral information changes to the learning scene during the execution of the driving support control, and/or when the scene specified by the peripheral information at the time when the execution of the driving support control is started is a learning scene, the target lateral position (including the shift start timing thereof) is changed based on the stored learning value. As a result, since the target lateral position becomes a value corresponding to the driver's preference, the possibility that the driver must perform a steering operation every time a similar scene occurs is reduced.

The present disclosure is not limited to the above embodiment and modification, and various modifications can be adopted within the scope of the present disclosure. For example, the device DS may execute the lane keeping control using the learned value as the lane keeping control during the automated driving. The device DS may execute the variable lateral position change control in a scene passing from the oncoming vehicle, and in this case, the shift starting timing of the target lateral position by the variable lateral position change control (the relative relation between the oncoming vehicle and the host vehicle when the steering operation is performed) is learned. Furthermore, as in the apparatus disclosed in JP 2023-62261 A, for example, control may be performed to change the target lateral position when a steering deviation state occurs by a steering operation during execution of lane keeping control. In this case, for example, the target lateral position at the time when the traveling lane passes through the provisional shared section may be learned as the first learned value. In addition, the learning scene is not limited to the above example, and may be, for example, a scene in which a roadside structure (for example, a soundproof wall having a high height) is installed on a road of one-side one lane and a center separation band or a road shoulder, a scene in which a cone indicating that a construction work is being performed on a road shoulder side of a traveling lane, or the like.

What is claimed is:

1. A vehicle control device comprising:
an information acquisition device that acquires peripheral information indicating a peripheral state of a host vehicle including a marking line of a traveling lane as a lane in which the host vehicle is traveling; and
a controller that executes driving assist control for automatically steering the host vehicle based on the peripheral information such that a lateral position of the host vehicle with respect to the traveling lane coincides with a target lateral position set in the traveling lane, wherein:
the controller is configured to store, when a steering deviation state in which the lateral position of the host vehicle deviates from the target lateral position is caused by a steering operation by a driver of the host vehicle during execution of the driving assist control, a value corresponding to the steering operation by the driver as a learning value in association with a learning scene determined in advance when a scene specified by the peripheral information is the learning scene; and
the controller is configured to vary the target lateral position based on the stored learning value in at least one of a case where the scene specified by the peripheral information varies from a scene other than the learning scene to the learning scene during the execution of the driving assist control and a case where a scene specified by the peripheral information at a time point when the execution of the driving assist control is started is the learning scene, after storing the learning value.

2. The vehicle control device according to claim 1, wherein:
the controller is configured to store a position corresponding to an actual lateral position of the host vehicle as a first learning value that is one of learning values, as the value corresponding to the steering operation by the driver, when the steering deviation state is caused when the scene specified by the peripheral information during the execution of the driving assist control is a first scene as the learning scene indicating that the traveling lane is within a provisional shared section; and
the controller is configured to set the target lateral position to a value based on the stored first learning value and execute the driving assist control in at least one of a case where the scene specified by the peripheral information during the execution of the driving assist control varies from a scene other than the first scene to the first scene and a case where a scene specified by the peripheral information at a time point when the execution of the driving assist control is started is the first scene, after storing the first learning value.

3. The vehicle control device according to claim 1, wherein:
the controller is configured to execute, as the driving assist control, variable lateral position control for shifting the target lateral position in a direction away from an adjacent vehicle traveling in a lane adjacent to the traveling lane by a predetermined distance when a relative relationship between the host vehicle and the adjacent vehicle becomes a predetermined relationship when the scene specified by the peripheral information during the execution of the driving assist control is a second scene as the learning scene in which the host vehicle passes the adjacent vehicle while traveling in the traveling lane;
the controller is configured to store the relative relationship between the host vehicle and the adjacent vehicle as a second learning value that is one of learning values in association with the second scene when the steering deviation state is caused before the target lateral position starts being shifted through the variable lateral position control; and
the controller is configured to start shifting the target lateral position in the variable lateral position control when the relative relationship between the host vehicle and the adjacent vehicle becomes a relationship determined based on the second learning value when the scene specified by the peripheral information during the execution of the driving assist control varies from a scene other than the second scene to the second scene, after storing the second learning value.

4. A vehicle control method comprising:

acquiring peripheral information indicating a peripheral state of a host vehicle including a marking line of a traveling lane as a lane in which the host vehicle is traveling;

executing driving assist control for automatically steering the host vehicle based on the peripheral information such that a lateral position of the host vehicle with respect to the traveling lane coincides with a target lateral position set in the traveling lane;

storing, when a steering deviation state in which the lateral position of the host vehicle deviates from the target lateral position is caused by a steering operation by a driver of the host vehicle during execution of the driving assist control, a value corresponding to the steering operation by the driver as a learning value in association with a learning scene determined in advance when a scene specified by the peripheral information is the learning scene; and varying the target lateral position based on the stored learning value in at least one of a case where the scene specified by the peripheral information varies from a scene other than the learning scene to the learning scene during the execution of the driving assist control and a case where a scene specified by the peripheral information at a time point when the execution of the driving assist control is started is the learning scene, after storing the learning value.

5. A non-transitory storage medium storing a program to be executed by a computer mounted on a host vehicle, the program causing the computer to execute a process comprising:

acquiring peripheral information indicating a peripheral state of the host vehicle including a marking line of a traveling lane as a lane in which the host vehicle is traveling;

executing driving assist control for automatically steering the host vehicle based on the peripheral information such that a lateral position of the host vehicle with respect to the traveling lane coincides with a target lateral position set in the traveling lane;

storing, when a steering deviation state in which the lateral position of the host vehicle deviates from the target lateral position is caused by a steering operation by a driver of the host vehicle during execution of the driving assist control, a value corresponding to the steering operation by the driver as a learning value in association with a learning scene determined in advance when a scene specified by the peripheral information is the learning scene; and varying the target lateral position based on the stored learning value in at least one of a case where the scene specified by the peripheral information varies from a scene other than the learning scene to the learning scene during the execution of the driving assist control and a case where a scene specified by the peripheral information at a time point when the execution of the driving assist control is started is the learning scene, after storing the learning value.

\* \* \* \* \*